(12) United States Patent
Shirazi et al.

(10) Patent No.: US 10,832,276 B2
(45) Date of Patent: Nov. 10, 2020

(54) SYSTEMS AND METHODS FOR AD PLACEMENT IN CONTENT STREAMS

(71) Applicant: Yahoo Holdings, Inc., Sunnyvale, CA (US)

(72) Inventors: Alireza Sahami Shirazi, San Jose, CA (US); Flippo Menczer, Bloomington, IN (US); Karen Church, San Francisco, CA (US)

(73) Assignee: Oath Inc., New York, NY (US)

( * ) Notice: Subject to any disclaimer, the term of this patent is extended or adjusted under 35 U.S.C. 154(b) by 448 days.

(21) Appl. No.: 14/951,683

(22) Filed: Nov. 25, 2015

(65) Prior Publication Data
US 2017/0148049 A1 May 25, 2017

(51) Int. Cl.
*G06Q 30/00* (2012.01)
*G06Q 30/02* (2012.01)

(52) U.S. Cl.
CPC ..... *G06Q 30/0244* (2013.01); *G06Q 30/0241* (2013.01); *G06Q 30/0246* (2013.01); *G06Q 30/0251* (2013.01); *G06Q 30/0254* (2013.01)

(58) Field of Classification Search
CPC .................................................. G06Q 30/02
USPC .......................................................... 705/14
See application file for complete search history.

(56) References Cited

U.S. PATENT DOCUMENTS

| | | | | |
|---|---|---|---|---|
| 7,734,624 B2 * | 6/2010 | Anderson | ............... | G06Q 30/02 707/727 |
| 8,494,902 B2 * | 7/2013 | Krantz | ................... | G06Q 30/02 705/14.25 |
| 8,788,338 B1 * | 7/2014 | Ruiz | .................. | G06Q 30/0247 705/14.41 |
| 2010/0023506 A1 * | 1/2010 | Sahni | ................ | G06F 17/30867 707/E17.014 |
| 2012/0323898 A1 * | 12/2012 | Kumar | ................... | G06F 16/957 707/723 |
| 2013/0198204 A1 * | 8/2013 | Williams | ........... | G06F 17/30864 707/748 |
| 2013/0254802 A1 * | 9/2013 | Lax | ......................... | G06Q 30/02 725/34 |

OTHER PUBLICATIONS

Duffett, Facebook advertising's influence on intention-to-purchase and purchase among Millennials, 2015, Internet Research, vol. 25, No. 4, pp. 498-526. (Year: 2015).*

* cited by examiner

*Primary Examiner* — Naresh Vig
(74) *Attorney, Agent, or Firm* — Cooper Legal Group, LLC

(57) ABSTRACT

The disclosure relates to a computer server system implementing a method to obtain a plurality of online articles for display on a webpage; obtain a candidate promoted content for each of the plurality of online articles; for each of the plurality of online article and the corresponding candidate promoted content pairs: determine a virality score of the online article indicating popularity of the online article among online users; determine a similarity score indicating similarity between the online article and the candidate promoted content; determine a qualification score based on the virality score and the similarity score; select a pair of target article and target promoted content from the plurality of article and candidate promoted content pairs based on the corresponding qualification scores; and display the target promoted content on the webpage.

20 Claims, 7 Drawing Sheets

SYSTEMS AND METHODS FOR AD PLACEMENT IN CONTENT STREAMS

BACKGROUND

This application relates generally to data processing systems. More particularly, this application relates to systems and methods for in-stream content advertising.

Online advertising has become increasingly popular as a way for advertisers to publicize information about goods and services to potential customers and clients. An advertiser can implement an advertising campaign using internet-accessible facilities of online providers such as Yahoo! Inc. The online provider serves to connect the advertiser with users accessing online resources such as search engines and news and information sites. Advertisements ("ads") of the advertiser are provided to the users to inform and attract the attention of the users.

The online provider makes available a variety of marketplaces for advertisers to conduct an advertising campaign. For example, Yahoo! Inc. provides many of its popular web properties, such as its front page and home page, on personal computer ("PC") and in applications ("apps") on mobile platforms for advertising campaigns.

Stream media display dominates these web pages of a few websites, such as www.yahoo.com. A stream media display on a web page is a stream of media content in which a sequence of items are displayed, one item after another, for example, down a web page viewed on a computer display or other device.

Streams are becoming common in online presentation because they provide added flexibility. If a stream is not used to present data on a web page, the web page must have pre-defined sections. Only certain types of information, having specified sizes, shapes or content, can be presented in the pre-defined sections. A stream allows any number and size and shape of content items to be included. The elements of the stream may be sorted by relevance or by any suitable parameter. A stream also lowers the cognitive load on the viewer when viewing content and advertisements on a web page.

Stream media use contextual, social, and topical information about the user to serve content. However, current technologies do not leverage the topicality nor the virality of contextual information in the placement of native ads. As a result, an ad displayed in the stream media often is not as relevant to its surrounding content as expected in order to lead to higher user engagement.

BRIEF SUMMARY

According to an aspect of the present disclosure, a computer server system may include a non-transitory, processor-readable storage medium including a set of instructions for placing promoted content in content streams; and a processor in communication with the at least one storage medium. When executing the set of instructions, the processor may be directed to: obtain a plurality of online articles for display on a webpage; obtain a candidate promoted content for each of the plurality of online articles; for each of the plurality of online article and the corresponding candidate promoted content pairs: determine a virality score of the online article indicating popularity of the online article among online users; determine a similarity score indicating similarity between the online article and the candidate promoted content; determine a qualification score based on the virality score and the similarity score; select a pair of target article and target promoted content from the plurality of article and candidate promoted content pairs based on the corresponding qualification scores; and display the target promoted content on the webpage.

According to another aspect of the present disclosure, a method for placing promoted content in content streams may comprise obtaining, by a computer, a plurality of online articles for display on a webpage; obtaining, by a computer, a candidate promoted content for each of the plurality of online articles; for each of the plurality of online article and the corresponding candidate promoted content pairs: determining, by a computer, a virality score of the online article indicating popularity of the online article among online users; determining, by a computer, a similarity score indicating similarity between the online article and the candidate promoted content; determining, by a computer, a qualification score based on the virality score and the similarity score; selecting, by a computer, a pair of target article and target promoted content from the plurality of article and candidate promoted content pairs based on the corresponding qualification scores; and displaying, by a computer, the target promoted content on the webpage.

According to yet another aspect of the present disclosure, a non-transitory processor-readable storage medium may comprise a set of instructions for placing promoted content in content streams, wherein when executed by a computer processor, the set of instructions directs the computer processor to perform acts of: obtaining a plurality of online articles for display on a webpage; obtaining a candidate promoted content for each of the plurality of online articles; for each of the plurality of online article and the corresponding candidate promoted content pairs: determining a virality score of the online article indicating popularity of the online article among online users; determining a similarity score indicating similarity between the online article and the candidate promoted content; determining a qualification score based on the virality score and the similarity score; selecting a pair of target article and target promoted content from the plurality of article and candidate promoted content pairs based on the corresponding qualification scores; and displaying the target promoted content on the webpage.

These and other advantages, aspects, and novel features of the present disclosure, as well as details of illustrated embodiments thereof, will be more fully understood from the following description and drawings.

DETAILED DESCRIPTION

Figure 1:
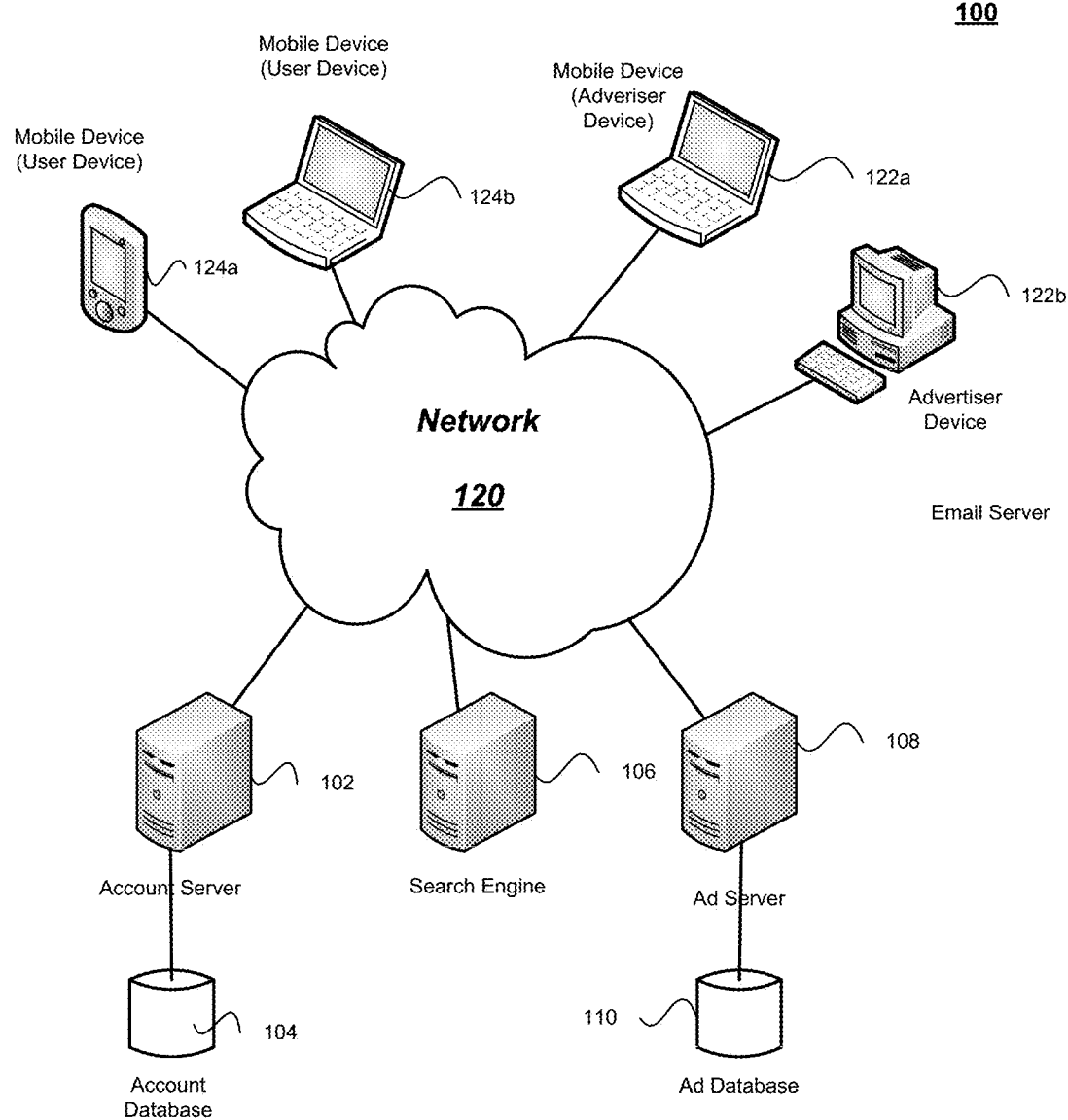
FIG. 1 is a block diagram of an example online information system.

As will be shown in the below systems and methods, the present disclosure provides solution to a problem that the current technologies do not leverage the topicality and the virality of contextual information in the placement of native ads. By placing an ad near topically related content that is likely to gain large amounts of attention, the technology in the present disclosure allows the ad to receive some of the attention of the nearby content, which leads to increased revenues by increasing both exposure and clickability of ads.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The following detailed description is, therefore, not intended to be limiting on the scope of what is claimed.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

An online information system places advertisements of advertisers within content services made available to end users, such as web pages, mobile applications ("apps"), TV apps, or other audio or visual content services. The advertisements are provided along with other content. The other content may include any combination of text, graphics, audio, video, or links to such content. The advertisements are conventionally selected based on a variety of criteria including those specified by the advertiser. The advertiser conventionally defines an advertising campaign to control how and when advertisements are made available to users and to specify the content of those advertisements. The content of the advertisements themselves is sometimes referred to as advertising creative or advertising creatives.

Various monetization techniques or models may be used in connection with sponsored advertising. In an auction-type online advertising marketplace, advertisers may bid in connection with placement of advertisements, although other factors may also be included in determining advertisement selection or ranking. Bids may be associated with amounts advertisers pay for certain specified occurrences, such as for placed or clicked-on advertisements, for example. Advertiser payment for online advertising may be divided between parties including one or more publishers or publisher networks, one or more marketplace facilitators or providers, or potentially among other parties.

FIG. 1 is a block diagram of an online information system 100. The online information system 100 in the example embodiment of FIG. 1 may include an account server 102, and account database 104, a search engine 106, an advertisement (ad) server 108, and an ad database 110. The online information system 100 may be accessible over a network 120 by one or more advertiser devices, such as advertiser device 122a, 122b, and by one or more user devices, such as user device 124a, 124b. In various examples of such an online information system, users may search for and obtain content from sources over the network 120. Advertisers may provide advertisements for placement on web pages and other communications sent over the network to user devices such as the user device 124a, 124b. The online information system in one example may be deployed and operated by an online provider such as Yahoo! Inc.

The account server 102 may store account information for advertisers. The account server 102 may be in data communication with the account database 104. Account information may include one or more database records associated with each respective advertiser. Any suitable information may be stored, maintained, updated and read from the account database 104 by the account management server 102. Examples include advertiser identification information, advertiser security information such as passwords and other security credentials, and account balance information. In some embodiments, an online provider which manages the online information system 100 may assign one or more account managers to a respective advertiser, and information about the one or more account managers may be maintained in the account database 104 as well as information obtained and recorded for subsequent access by an account manager.

The account server 102 may be implemented using any suitable device. For example, the account management server 102 may be implemented as a single server, a plurality of servers, or any other type of computing device known in the art. Access to the account server 102 may be accomplished through a firewall, not shown, which protects the account management programs and the account information from external tampering. Additional security may be provided via enhancements to the standard communications protocols such as Secure HTTP or the Secure Sockets Layer.

The account server 102 may provide an advertiser front end to simplify the process of accessing the account information of an advertiser. The advertiser front end may be a program, application or software routine that forms a user interface. According to the example embodiments of the present disclosure, the advertiser front end may be accessible as a web site with one or more web pages that an accessing advertiser may view on an advertiser device such as advertiser device 122a, 122b. The advertiser may view and edit account data using the advertiser front end. After editing the advertising data, the account data may then be saved to the account database 104.

The search engine 106 may be a computer system, one or more servers, or any other computing device known in the art. Alternatively, the search engine 106 may be a computer program, instructions, or software code stored on a computer-readable storage medium that runs on a processor of a single server, a plurality of servers, or any other type of computing device known in the art. The search engine 106 may be accessed, for example, by user devices such as the user device 124a, 124b operated by a user over the network 120. The user device 124a, 124b may communicate a user query to the search engine 106. The search engine 106 may locate matching information using any suitable protocol or algorithm and returns information to the user device 124a, 124b. The search engine 106 may be designed to help users find information located on the Internet or an intranet. According to the example embodiments of the present disclosure, the search engine 106 may also provide to the user device 124a, 124b over the network 120 a web page with content including search results, information matching the context of a user inquiry, links to other network destinations or information and files of information of interest to a user operating the user device 124a, 124b.

The search engine 106 may enable a device, such as the user device 124a, 124b or any other client device, to search for files of interest using a search query. Typically, the search engine 106 may be accessed by a client device via one or more servers or directly over the network 120. The search engine 106 may, for example, comprise a crawler component, an indexer component, an index storage component, a search component, a ranking component, a cache, a profile storage component, a logon component, a profile builder, and one or more application program interfaces (APIs). The search engine 106 may be deployed in a distributed manner, such as via a set of distributed servers, for example. Components may be duplicated within a network, such as for redundancy or better access.

The ad server 108 may operate to serve advertisements to user devices such as the user device 124a, 124b. Advertisements include data defining advertisement information that may be of interest to a user of a user device. An advertisement may include text data, graphic data, image data, video data, or audio data. An advertisement may further include data defining one or more links to other network resources providing such data. The other locations may be other locations on the internet, other locations on an intranet operated by the advertiser, or any access.

For online information providers, advertisements may be displayed on web pages resulting from a user-defined search based at least in part upon one or more search terms. Advertisements may also be displayed based on content of a webpage that the user opens. Advertising may be beneficial to users, advertisers or web portals if displayed advertisements are relevant to interests of one or more users.

The ad server 108 may include logic and data operative to format the advertisement data for communication to the user device. The ad server 108 may be in data communication with the ad database 110. The ad database 110 may store information including data defining advertisements to be served to user devices. This advertisement data may be stored in the ad database 110 by another data processing device or by an advertiser.

Further, the ad server 108 may be in data communication with the network 120. The ad server 108 may communicate ad data and other information to devices over the network 120. This information may include advertisement data communicated to a user device. This information may also include advertisement data and other information communicated with an advertiser device such as the advertiser device 122a, 122b. An advertiser operating an advertiser device may access the ad server 108 over the network to access information including advertisement data. This access may include developing advertisement creatives, editing advertisement data, deleting advertisement data and other activities.

The ad server 108 may provide an advertiser front end to simplify the process of accessing the advertising data of an advertiser. The advertiser front end may be a program, application or software routine that forms a user interface. In one particular embodiment, the advertiser front end is accessible as a web site with one or more web pages that an accessing advertiser may view on the advertiser device. The advertiser may view and edit advertising data using the advertiser front end. After editing the advertising data, the advertising data may then be saved to the ad database 110 for subsequent communication in advertisements to a user device.

The advertisement server 108 may be a computer system, one or more servers, or any other computing device known in the art. Alternatively, the advertisement server 108 may be a computer program, instructions and/or software code stored on a computer-readable storage medium that runs on a processor of a single server, a plurality of servers, or any other type of computing device known in the art.

The account server 102, the search engine 106, and the ad server 108, may be implemented as any suitable computing device. A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

The network 120 may include any data communication network or combination of networks. A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network such as the network 120. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

The advertiser device 122a, 122b may include any data processing device which may access the online information system 100 over the network 120. The advertiser device 122a, 122b may be operative to interact over the network 120 with the account server 102, the search engine 106, the ad server 108, content servers and other data processing systems. The advertiser device 122a, 122b may, for example, implement a web browser for viewing web pages and submitting user requests. The advertiser device 122a, 122b may communicate data to the online information system 100, including data defining web pages and other information. The advertiser device 122a, 122b may receive communications from the online information system 100, including data defining web pages and advertising creatives.

The user device 124a, 124b may include any data processing device which may access the online information system 100 over the network 120. The user device 124a, 124b may be operative to interact over the network 120 with the search engine 106. The user device 124a, 124b may, for example, implement a web browser for viewing web pages and submitting user requests. A user operating the user device 124a, 124b may enter a search request and communicate the search request to the online information system 100. The search request may be processed by the search engine and search results may be returned to the user device 124a, 124b. In other examples, a user of the user device 124a, 124b may request data such as a page of information from the online information processing system 100. The data instead may be provided in another environment such as a native mobile application, TV application, or an audio application. The online information processing system 100 may provide the data or re-direct the browser to another web site. In addition, the ad server may select advertisements from the ad database 110 and include data defining the advertisements in the provided data to the user device 124a, 124b.

The advertiser device 122a, 122b and the user device 124a, 124b may operate as a client device when accessing information on the online information system. A client device such as the advertiser device 122a, 122b and the user device 124a, 124b may include a computing device capable of sending or receiving signals, such as via a wired or a wireless network. A client device may, for example, may include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. In the example of FIG. 1, a laptop computer 124b and a smartphone 124a may be operated interchangeably as an advertiser device or as a user device.

Figure 2:
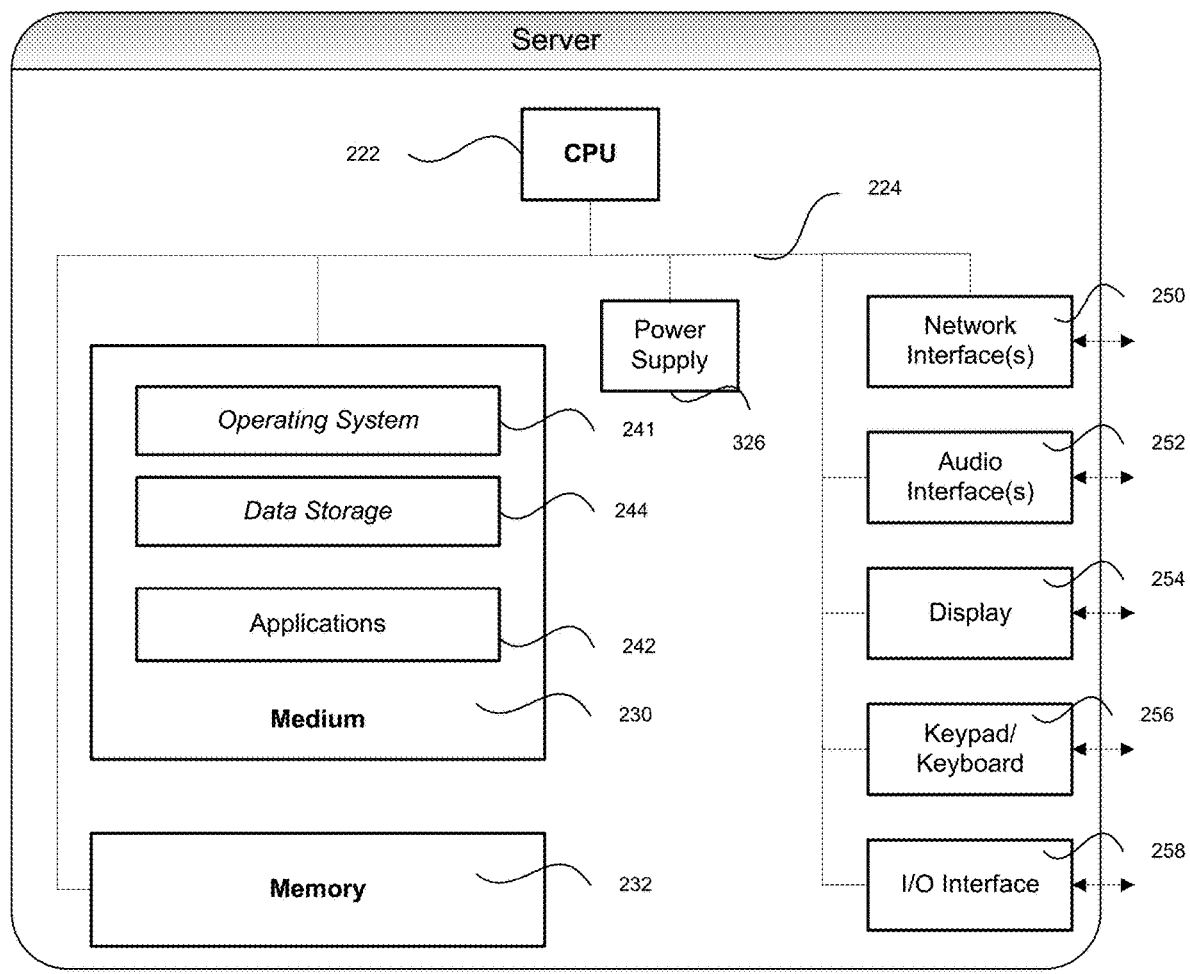
FIG. 2 is a schematic diagram illustrating an example embodiment of a server.

FIG. 2 is a schematic diagram illustrating an example embodiment of a server 200. The server 200 may be used as the account server 102, the search engine 106, and the ad server 108 of FIG. 1. A server 200 may vary widely in configuration or capabilities, but it may include one or more central processing units 222 and memory 232, one or more media 230 (such as one or more mass storage devices) storing application programs 242 or data 244, one or more power supplies 226, one or more wired or wireless network interfaces 250, one or more input/output interfaces 258, and/or one or more operating systems 241, such as Windows Server™, Mac OS X™, Unix™, Linux™, FreeBSD™, or the like. Thus a server 200 may include, as examples, dedicated rack-mounted servers, desktop computers, laptop computers, set top boxes, mobile computational devices such as smart phones, integrated devices combining various features, such as two or more features of the foregoing devices, or the like.

The account server 102, the search engine 106, and the ad server 108 illustrated in FIG. 1 may be implemented as content servers or may be in communication with content servers. A content server may include a device that includes a configuration to provide content via a network to another device. A content server may, for example, host a site, such as a social networking site, examples of which may include, but are not limited to, Flicker™, Twitter™, Facebook™, LinkedIn™, or a personal user site (such as a blog, vlog, online dating site, etc.). A content server may also host a variety of other sites, including, but not limited to business sites, educational sites, dictionary sites, encyclopedia sites, wikis, financial sites, government sites, etc. A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as a content server include desktop computers, multiprocessor systems, microprocessor-type or programmable consumer electronics, etc. The content servers may not be under common ownership or control with the ad server or servers.

Figure 3:
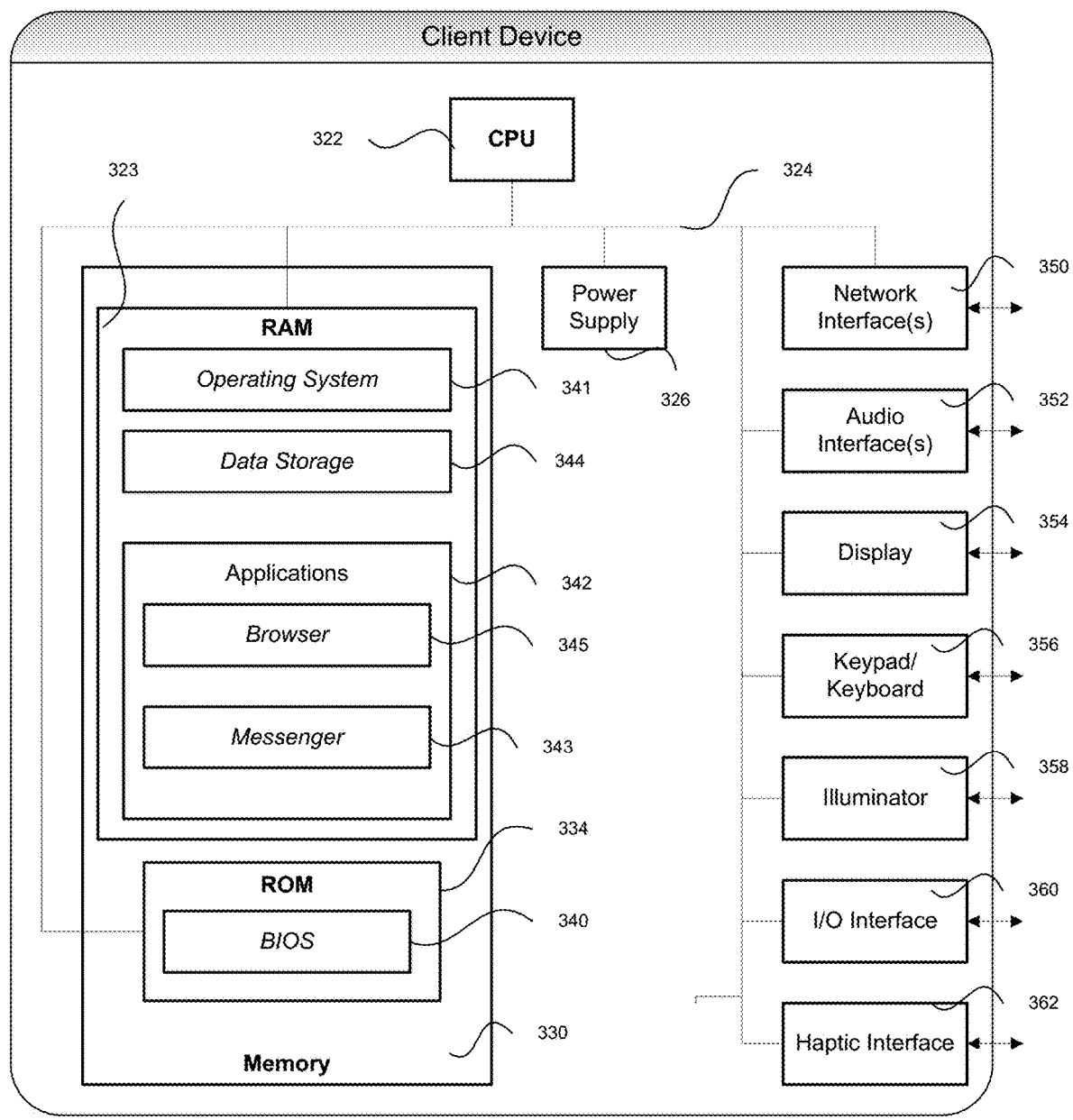
FIG. 3 is a schematic diagram illustrating an example embodiment of a client device.

FIG. 3 is a schematic diagram illustrating an example embodiment of a client device that may be used as the user device 124a, 124b and the advertiser device 122a, 122b. The client device may include apparatuses to execute methods and software systems introduced in the present disclosure. A client device 300 may be a computing device capable of executing a software system. The client device 300 may, for example, be a device such as a personal desktop computer or a portable device, such as a laptop computer, a tablet computer, a cellular telephone, or a smart phone.

The client device 300 may vary in terms of capabilities or features. Claimed subject matter is intended to cover a wide range of potential variations. For example, the client device 300 may include a keypad/keyboard 356. It may also include a display 354, such as a liquid crystal display (LCD), or a display with a high degree of functionality, such as a touch-sensitive color 2D or 3D display. In contrast, however, as another example, a web-enabled client device 300 may include one or more physical or virtual keyboards, and mass storage medium 330.

The client device 300 may also include or may execute a variety of operating systems 341, including an operating system, such as a Windows™ or Linux™, or a mobile operating system, such as iOS™, Android™, or Windows Mobile™. The client device 300 may include or may execute a variety of possible applications 342, such as an electronic game 345. An application 342 may enable communication with other devices via a network, such as communicating with another computer, another client device, or server via a network.

Further, the client device 300 may include one or more non-transitory processor-readable storage media 330 and one or more processors 322 in communication with the non-transitory processor-readable storage media 530. For example, the non-transitory processor-readable storage media 330 may be a RAM memory, flash memory, ROM 334, 340 memory, EPROM memory, EEPROM memory, registers, hard disk, a removable disk, a CD-ROM, or any other form of non-transitory storage medium known in the art. The one or more non-transitory processor-readable storage media 330 may store sets of instructions, or units and/or modules that include the sets of instructions, for conducting operations and/or method steps described in the present disclosure. Alternatively, the units and/or modules may be hardware disposed in the client device 300 configured to conduct operations and/or method steps described in the present disclosure. The one or more processors may be configured to execute the sets of instructions and perform the operations in example embodiments of the present disclosure.

Merely for illustration, only one processor will be described in client devices and servers that execute operations and/or method steps in the following example embodiments. However, it should be note that the client devices and servers in the present disclosure may also include multiple processors, thus operations and/or method steps that are performed by one processor as described in the present disclosure may also be jointly or separately performed by the multiple processors. For example, if in the present disclosure a processor executes both step A and step B, it should be understood that step A and step B may also be performed by two different processors jointly or separately in the client device (e.g., the first processor executes step A and the second processor executes step B, or the first and second processors jointly execute steps A and B).

Figure 4:
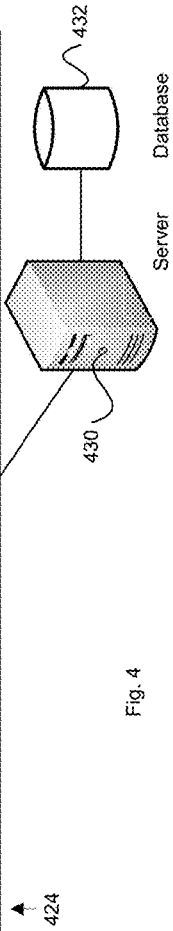
FIG. 4 is an example illustrating a system for providing a web page with a stream media display layout.

FIG. 4 is an example illustrating a system 400 for providing a platform that displays internet contents thereon. This figure will be introduced in conjunction with FIG. 5, which is a schematic diagram of a content database 500.

The system 400 may include at least one server 430 providing online contents to an online platform 402. The online platform 402 may be a website and/or web page, or may be a social medium that displays the online contents in a form of content stream. For illustration purpose, the present disclosure uses a web page as an example for the online platform 402. The server 430 may be a cumulative representation of the servers 102, 106, and 108 in FIG. 1 or may be a cumulative representation of a part of these servers. The server 430 may be in communication with at least one database 432 to provide data to a web page 400. The database 432 may include a content database, including a plurality of articles to be displayed on the web page 400. The articles may be any form of content items. For example, the articles may be textual items (e.g., textual reports, stories, etc.), social media posts (status updates, photos, links, etc.), contents of multimedia (e.g., audio/video clips), or a combination thereof.

The database 432 may also include an ad database, including a plurality of promoted contents to be displayed in the website. For example, the promoted contents may be ads, news, articles, or other contents that the system 400 may engage in promoting through the Internet or network. For convenient purpose, the following disclosure uses online ads as an example for the promoted contents.

The database 432 may be stored in a non-transitory processor-readable storage medium in communication with the server 430. The web page 402 may be a front page, landing page, or a web page of a specific topic (e.g., sports, finance, news etc.) of a website. The web page 402 may be displayed on a browser of a user device 124a, 124b, or may be accessed through an application on a mobile device, such as the Tumblr application.

The web page 402 may include a column of stream 424, which may be positioned in the center column of the web page. The stream 424 may include a stream of slots, in which a sequence of items 416, 418a, 418b, 420 is displayed, one item after another. Each item 416, 418a, 418b, or 420 may include a textual summary 426 of the item. The item 416, 418, or 420 may also include graphics 426, other data, and a link 427 to additional information of the item. Clicking or otherwise selecting the link 427 may re-direct the browser on the user device 124a, 124b to a web page with the additional information.

The stream 424 of items 416, 418, 420 may include any type of content items. For example, the stream 424 may include articles 416, 418a, 418b, and ads 420. The articles 416, 418a, 418b may include news, business-related articles, sports-related articles, etc. In addition to textual or graphical content, the articles 416, 418a, 418b may include other data, such as audio and video data or applications.

The articles 416, 418a, 418b may be individually selected for the user that is viewing the web page. Different users may see different lists of articles 416, 418a, 418b or other content items in the column of stream 424 even if the users are visiting the same web page. For example, if user A is a fan of automobiles, the articles 416, 418a, 418b displayed on the web page may be automobile related. Another user, user B, may not see the same listing of articles 416, 418a, 418b as user A does because user B may not have the same passion for automobile as user A does.

The articles 416, 418a, 418b may be selected from at least one content database 432 by the server 430. The content database 432 may be generated by the server 430 of the web page 402 or an independent server (not shown). Further, the content database 432 may be organized as a hierarchical taxonomy, such as Yahoo! Content Taxonomy (YCT).

Figure 5:
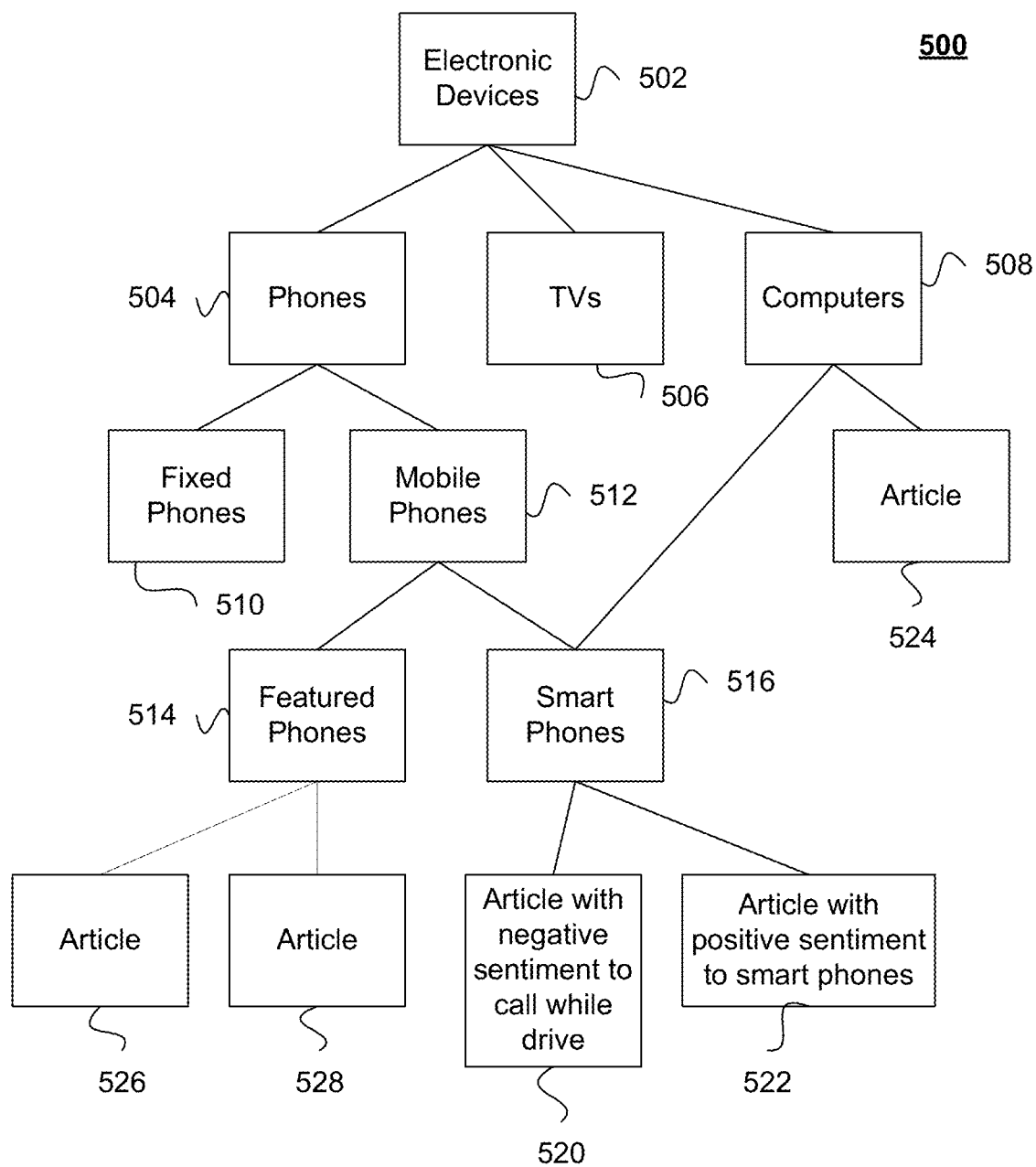
FIG. 5 is a schematic diagram of a content database under a hierarchical content taxonomy according to example embodiments of the present disclosure.

FIG. 5 is a schematic diagram of a content database 500 under a hierarchical content taxonomy according to the example embodiments of the present disclosure. The content database 500 may serve as the content database 432 for in-stream article selection as shown in FIG. 4. The content database 500 may include a plurality of articles 520, 522, 524, 526, 528. Content of each article may relate to at least one topic. For example, articles 520, 522 may relate to smart phones; article 524 may relate to computers; and articles 526, 528 may relate to featured phones.

When an article 520, 522, 524, 526, 528 is first received by the server 430, the server may analyze and determine contents and/or themes of the articles 520, 522, 524, 526, 528. The analysis may be based on keywords comparison or based on context semantic analysis. The present disclosure intends to cover the broadest technologies in content analysis available before and after the time of the filing of the present disclosure. For example, the server may search through the content of the article for specific keywords and compare the specific keywords with a keyword database to determine whether the context of the keywords is related to specific content or theme. The keyword searched in the article may be a single word, a phrase, a continued string of words, or any form feasible to content analysis that can be reasonably perceived by one of ordinary skill in the art at the time of the filing of this disclosure. The keyword database may be saved in at least one non-transitory processor-readable storage medium in communication with the server, and may include a plurality of reference keywords organized under a variety of categories of content and/or theme. By comparing the searched keyword in the article and reference keywords in the keyword database (e.g., vector comparison), the server may determine the content or themes of the article.

Based on the contents and/or themes, the server may classify each of articles 520, 522, 524, 526, 528 into a category. For example, the server may determine that articles 520, 522, 524, 526, 528 all relate to electronic devices, therefore classifying and/or categorizing the articles 520, 522, 524, 526, 528 under an "Electronic Devices" category 502.

The server may further refine the categorization until the lowest level categories are detailed enough to sufficiently distinguish the articles. For example, in FIG. 5 the "Electronic Device" category 502 is further divided as "Phones" 504, "TVs" 506, and "Computers" 508. The "Phone" category 504 is further divided as "Fixed Phones" 510 and "Mobile Phones" 512, which are further divided as "Featured Phones" 514 and "Smart Phones" 516. As a result, articles 520, 522 are eventually categorized under "Smart Phones" 516; articles 526, 528 are eventually categorized under "Featured Phones" 514; and article 534 is eventually categorized under "Computers" 508.

Further, depending on their content and/or themes, some categories or articles may be cross-categorized. For example, the category "Smart Phones" 516 is under "Mobile Phones" 512 but may also be a sub-category of "Computer" 508; and an article of smart phone (e.g., articles 520, 522) may also be categorized under "Computer" 508 directly or indirectly.

The articles 416, 418a, 418b may further be selected based on historical online activity information of a user. Several methods may be adopted to obtain the historical online activity information of the user. For example, the server of the web page may employ demographic characteristics (e.g., age, income, sex, occupation, etc.) of the user for predicting user behavior, such as by group. Contents of the articles 416, 418a, 418b may be selected and presented to users in a targeted audience based at least in part upon a match between the selected contents and predicted user behavior.

Another approach of the content selection may include profile-type content targeting. In this approach, user profiles specific to a user may be generated to model user behavior, for example, by tracking a user's path through a web site or network of sites, and compiling a profile based at least in part on pages ultimately delivered. A correlation may be identified, such as for user purchases, for example. An identified correlation may be used to target potential viewers by targeting content to particular users.

The historical online activities, such as the demographic information and browsing path of the user, may be obtained through various methods. For example, the server may generate an entry to a cookie file in the user device 124a, 124b every time when the user visits the website. The entry may record the time and web page and/or content of the web page that the user browses in the website, so that the server may be able to collect the browsing history of the user in the website and generate a profile for the user. The profile information may also be obtained if the user has an account on the website, in which the user discloses his/her personal information, such as name, age, gender, occupation etc.

To obtain the online activity history of the user in other websites, the server 430, or a third party data collector, may also embed a tracking application, such as an invisible pixel, to a third party website (or a particular web page of the third party website) before the user visits the third party website. The tracking application may include an identification that associates the tracking application with the third party website. Further, the tracking application may be configured to generate an entry in a cookie file of the user device when the user visits the third party website, wherein the entry may record the identification of the tracking application as well as the online activity of the user in the third party website. Accordingly, because the server 430 or the third party data provider knows that a particular tracking application is embedded in a particular website and knows the identification of the particular tracking application, by accessing to the entry of the cookie file, the server 430 or the third party data collector may be able to retrieve the online activity of the user in the third party website. The server 430 may be able to track the online activity information either by itself or by buying the online activity information from the third party data collector.

Because each article in the stream 424 displayed on the webpage 402 is specifically selected for the user, the likelihood of the articles being clicked and read by the user is greater.

Each of the articles in the stream 424 displayed on the webpage 402 may be associated with a virality score reflecting a predicted popularity of the article among Internet users. In similar fashion as set forth above, the system may be able to track a huge amount of user behaviors over the articles in the content database 500 and analyze how popular each article is.

Virality is a quality or fact of being viral, it is a measurement of tendency of an image, video, or piece of information to be circulated rapidly and widely from one Internet user to another. For an article published on the Internet, the higher the virality score of an article, the higher the likelihood that the article may be read, liked, shared, followed, and/or cited by Internet users and be widely and swiftly spread, and/or broadcasted through the Internet.

The virality of an old article may be measured based on its past performance. The past performance may include, but is not limited to, the population of users who have previously interacted with the article, such as by reading, liking, sharing, following, citing, commenting, and repeatedly conducting the above performances (e.g., reading, sharing, following, citing, commenting). The past performance may also include, for example, the diversity of the population reading, liking, sharing, following, citing, commenting the article. For example, the diversity may be measured by entropy across communities in the recent past (e.g., a day, a week, or a month) and used as a feature, along with the number of followers of those users. The larger the entropy of the article, the higher the virality score.

The virality of the old article may also be measured by characteristics of the users who have previously interacted with the article. For example, users who post about many diverse topics may be more likely to act as bridges between communities. So if such a bridge-user shares the article, that may be indicative of higher virality. An article that contains hashtags that usually do not co-occur may also be indicative of viral content.

The virality of an article may also be predicted based on virality of other articles with similar features. For example, the system may analyze historical articles and conclude that articles with controversial content, or articles that can be categorized as controversial, normally obtain more attention than other type of articles. Thus a new article that can be categorized as controversial may be predicted to be of high expectation of virality. As another example, when a big event that draws pubic attention occurs, such as Olympic Games, an article that relates to the big event may be predicted to have higher expectation of virality. The system may be able to analyze features of an article and may predict the virality of the article based on historical virality performances of articles with similar features.

As such, the system may be able to obtain a virality score for each of the articles in the content database 500, and each of the articles in the stream 424 displayed on the webpage 402 may be associated with their respective virality score.

After the articles 416, 418a, 418b have been selected to display or to be displayed to the user on a user device, such as the client device 300, the server 430 may select to display and/or promote one or more target online ads on the webpage 402. To this end, the server 430 may select for each of the articles 416, 418a, 418b a candidate ad. In an example implementation, for each article, the server 430 may select the candidate ad from an online ad database including a plurality of online ads. Further, the candidate ad may be selected based on a similarity between the article and the plurality of ads.

Figure 6:
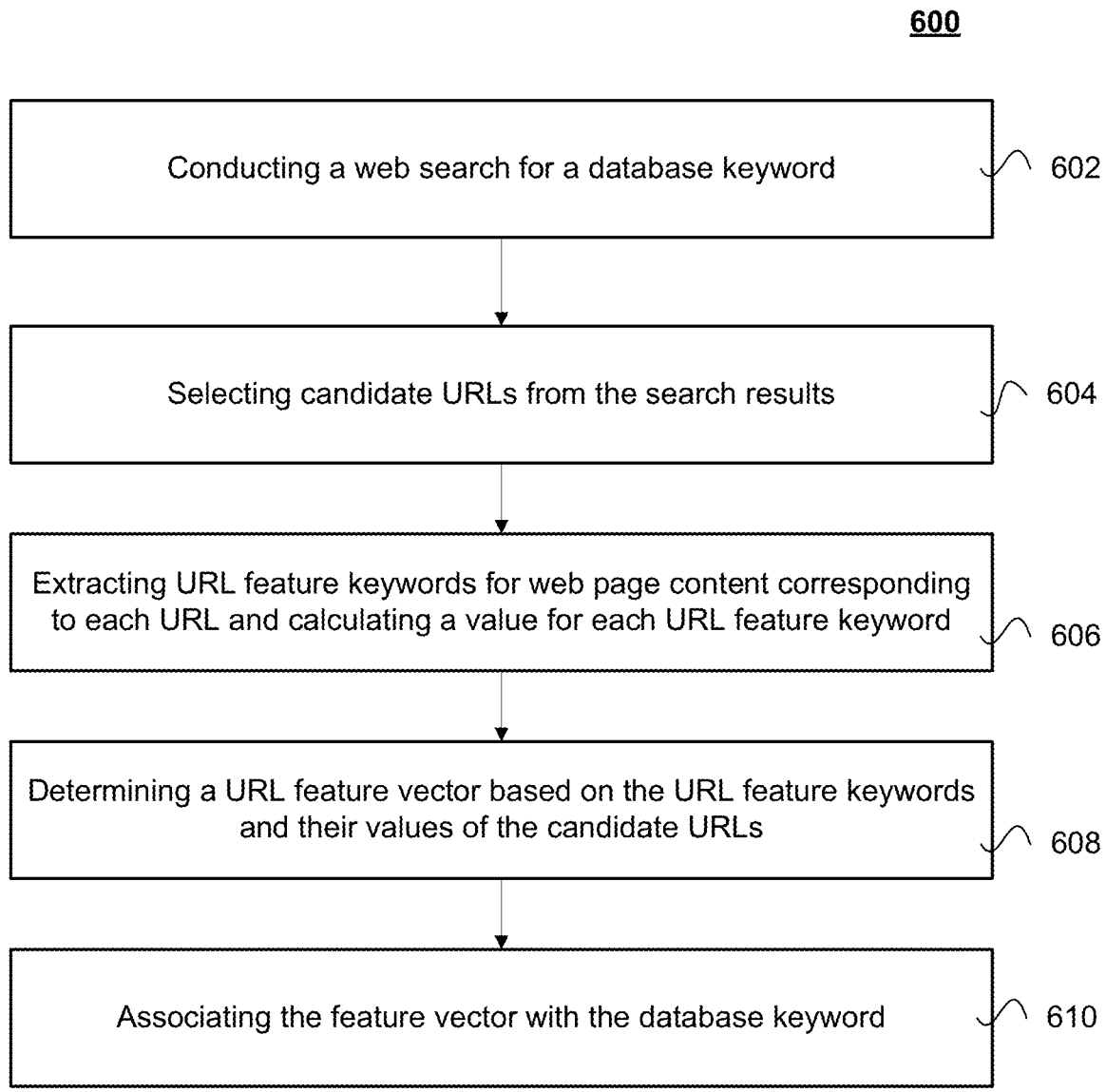
FIG. 6 is a flowchart illustrating how to determine similarity between an ad and an article according to the example embodiments of the present disclosure.

FIG. 6 is a flowchart illustrating how to determine similarity between an ad and an article. The procedure in the flowchart may be executed by a computer server, such as the server 200. The processor of the server may execute a set of instructions stored in its non-transitory storage medium to perform the actions in the procedure.

In Step 602, the server may generate a feature vector for each of the plurality of articles displayed or to be displayed on the webpage 402.

To this end, the server may first extract the content of the article. For example, the server may extract only the textual content from the article, and then the server may compare the content with a dictionary to extract the feature keywords from the content. The dictionary may be a an encyclopedia-type of keyword database. For example, the database may include keywords such as keyword_1, keyword_2, ..., keyword_n .... Further, the keywords in the database may be organized as a huge vector. For example, the dictionary may be in a form of <keyword_1,keyword_2, ... ,keyword_n ... >.

Further, the server may calculate a value for each feature keyword that reflects the importance of the feature keyword in the content of the article. The calculation may be based on a semantic value of the article feature keyword as well as the likelihood that the corresponding article will be selected by a user. For example, the server may conduct a TF-IDF (term frequency-inverse document frequency) analysis for each feature keyword throughout the content of the article, and obtain a corresponding TF-IDF score of the feature keyword. Then the server may combine the values and feature keywords to form a vector based on the format of the dictionary. For example, an article feature vector for an article may be if a form:

<value_1,value_2, ... value_n ... >, wherein value_n is the value corresponding to the nth keyword. Noted that since the dictionary is very huge and the article has limited keywords, the article feature vector is normally sparse.

The server may conduct the above feature keyword extractions and value of importance calculations for each article displayed or to be displayed on the webpage 402, and collect the feature keywords thereof.

Next, the server may select a candidate ad for the article. After receiving the creative from the ad database or from an advertiser in Step 604, the server may determine a feature vector (hereinafter "the creative feature vector") for the creative.

To this end, in Step 606, the server may extract keywords (hereinafter "the creative keywords") from the creative, based on a dictionary, and construct an creative feature vector in a similar way as the extraction procedure in Step 601.

In Step 608, the server may calculate a similarity score (e.g., cosine similarity) between the creative feature vector and the article feature vector of each articles in the webpage 402.

Then in Step 610, the server may calculate the similarity score between each article on the webpage 402 with a plurality of ads from the online ad database and select an ad with the highest similarity score as the candidate ad.

Once the server 430 determines a candidate ad for each article on the webpage 402, the server 430 may combine the virality score and the similarity score corresponding to the article and the candidate ad to determine a qualification score. The qualification score may be a linear combination of the virality score and the similarity score. For example, the qualification score may be in a formula of Qualification score=$a$×virality score+$b$×similarity score, where empirical a and b are weight factors. Alternatively, the qualification score may also be another type of combination of the virality score and similarity score, such as a product of the two scores. Thus the qualification score may be a measurement reflecting both the popularity of the article and the similarity of the article and the candidate ad.

The server 430 may compare the qualification scores of each <article, candidate ad> pair and, based on their corresponding qualification score, select a pair as a target pair. The server 430 may then display the candidate ad in the target pair as a target ad on the webpage 402. For example, the server 430 may select a <article, candidate ad> pair of the highest qualification score and treat the article therein as a target article and the candidate ad therein as the target ad and display the target ad together with the target article. For example, in FIG. 4, the server 430 may determine that an article 418b regarding a car accident has a high virality score and it is strongly relevant to (therefore similar to) an ad 420 promoting high safety feature of a vehicle. The server 430 may determine that the qualification score of the article 418b and ad 420 is the highest among other <article, candidate ad> pairs on webpage 402. Thus the server 430 may determine to display the ad 420 as a target ad.

The server 430 may display the target ad in a predetermined slot in the stream 424 or display the target ad next to the target article, so that a user who is attracted by the target article may have a high probability to read the target ad as well. Further, once the target article is selected, the server 430 may change the relative positions or orders of the plurality of articles 416, 418a, 418b on the webpage 402 to place the target article and target ad in a position easier to draw the attention of the user. For example, if the target article 418b is initially on the bottom of the stream 424 on the webpage 402, the server 430 may rearrange the order of the plurality articles 416, 418a, 418b, so as to move the target article 418b to a predetermined position. For example, the predetermined position may be in the middle or upper portion of the webpage 402, which is easier to draw the attention of the user. Thus placing the target ad 420 next to the target article 418b may increase the possibility that the user draws his/her attention to the target ad.

Figure 7:
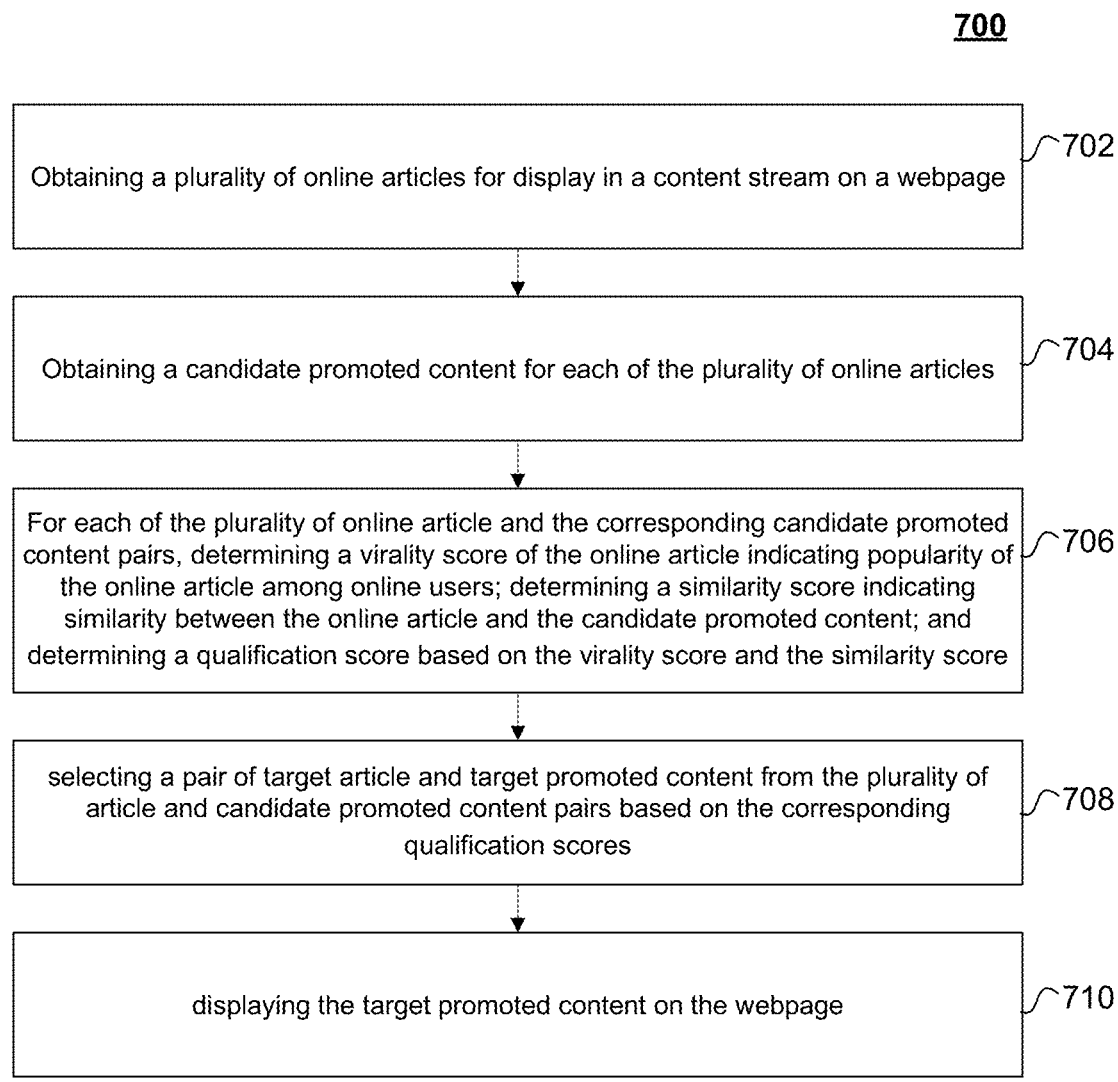
FIG. 7 illustrates a flow chart of a method for a method for ad placement in content streams according to the example embodiments of the present disclosure.

FIG. 7 illustrates a flow chart of a method for content placement in a content stream in conjunction with the system shown in FIG. 4. The method may be implemented by at least one server, such as the servers 102, 106, 108 as shown in FIG. 1, which may have a structure shown in FIG. 2. The server may be used to support operations of a website, such as the website 400 in FIG. 4. The method may be stored in at least one non-transitory processor-readable storage medium in a form of at least one set of instructions. At least one storage medium may be configured to communicate with at least one processor (hereinafter "the processor") of at least one server. When the processor executes the at least one instructions, at least one instructions may direct the processor to execute the following steps.

In Step 702, the processor obtains a plurality of online articles for display in a content stream on a webpage.

To this end, the processor may first receive a request to open the webpage with the content stream from a user over a network. The processor then may obtain information of the user and select the plurality of articles to display in the stream of content based on the information of the user. Further, the processor may display the plurality of online articles in the content stream on the webpage under a first order. The first order of the selected plurality of articles may be predetermined under a rule or may be randomly obtained.

In Step 704, the processor obtains a candidate promoted content for each of the plurality of online articles.

The processor may select the candidate promoted content from a promoted content database based on the information of the user and content of the article. The candidate promoted content may be an ad, an article, news, audio visual content or other contents that the system 400 may engage in promoting through the Internet or network. For convenience purposes, the following disclosure uses online ads as an example for the promoted contents.

For example, the processor may select a candidate ad for an article based on similarity between the candidate ad and the article. To this end, the processor may obtain a feature vector of the article and then access a hierarchical ad database. The processor may search through a plurality of ads in the ad database, each of the plurality of ads may be associated with an ad feature vector. Further, the article feature vector and the ad feature vector may be determined in the same manner as set forth in conjunction with FIG. 4. The processor may compare the ad feature vector of each of the plurality of ads with the article feature vector. The ad whose ad feature vector has the highest similarity with the article feature vector may be selected as the candidate ad. Because each of the plurality of articles in the content stream is also associated with a candidate ad, the content stream on the webpage may comprise a plurality of <online article, candidate ad> pair.

In Step 706, for each of the plurality of online article and candidate ad pairs, the processor determines a virality score of the online article indicating popularity of the online article among online users; determines a similarity score indicating similarity between the online article and the candidate promoted content; and determines a qualification score based on the virality score and the similarity score. For example, the qualification score may be a linear combination of the similarity score and the virality score or may be a product of the two scores.

In Step 708, the processor selects a pair of target article and target ad from the plurality of article and candidate promoted content pairs based on the corresponding qualification scores. For example, the processor may select from the plurality of online article and candidate ad pairs the one with the highest qualification scores as the target article and target candidate ad pair. When n candidate ads are promoted, where n is an integer greater than 1, the server may select n article and candidate ad pairs with the first n highest qualification scores as the target pairs for ad display.

In Step 710, the processor displays the target ad on the webpage.

For example, the processor may display the target ad in a position of the content stream close or next to the target article under the first order. Alternatively, the processor may rearrange the first order of the plurality of articles to move the target article in a new position. The new position may be a predetermined position in the first order. For example, the predetermined position may be the first slot in the content stream, so that the target article will appear as the first article on the client deice of the user. The new position may also be dynamically assigned, so that it always locates in a best position on the screen of the client device to draw the attention of the user. As an example, the new position for the target article may be in the middle or top ⅓ of the screen and the target ad is placed next to the target article. As a result, the target article may have the highest chance to catch the user's attention and thereby the likelihood that the target ad also catches the user's attention may be increased. As another example, the new position for the target article may be next to the best position to draw the user's attention and the target ad is placed in the best position.

As shown in the above systems and methods, the present disclosure provides solution to a problem that the current technologies do not leverage the topicality and the virality of contextual information in the placement of native ads. By placing an ad near topically related content that is likely to gain large amounts of attention, the technology in the present disclosure allows the ad to receive some of the attention of the nearby content, which leads to increased revenues by increasing both exposure and clickability of ads.

Further, the systems and methods may also be implemented to other types of contents. Instead of articles, the systems and methods may be implemented to social media posts (status updates, photos, links, etc.). This content may be accessed through an app on a mobile device, such as the Tumblr app. Promoted content (e.g., ads or any other types of contents) may be displayed in the stream of social media posts/articles, next to posts/articles that are relevant to the promoted content and predicted to be viral.

While example embodiments have been particularly shown and described with reference to FIGS. 1-7, it will be understood by one of ordinary skill in the art that various changes in form and details may be made therein without departing from the spirit and scope of example embodiments, as defined by the following claims. The example embodiments, therefore, are provided merely to be illustrative and subject matter that is covered or claimed is intended to be construed as not being limited to any example embodiments set forth herein. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

We claim:

1. A computer server system, comprising:
   a non-transitory processor-readable storage medium including a set of instructions for placing promoted content in content streams; and a processor in communication with the storage medium, wherein when executing the set of instructions, the processor is directed to:
  obtain a plurality of online articles for display on a webpage;
  obtain at least one candidate promoted content for each of the plurality of online articles to form a plurality of online article and candidate promoted content pairs;
  for each of the plurality of online article and candidate promoted content pairs:
    determine a virality score of an online article, of an online article and candidate promoted content pair, indicating popularity of the online article among online users;
    determine a similarity score indicating similarity between the online article and a candidate promoted content of the online article and candidate promoted content pair; and
    determine a qualification score for the online article and candidate promoted content pair based on the virality score of the online article and the similarity score of the online article and the candidate promoted content;
  select a target pair comprising a target article and a target promoted content from the plurality of online article and candidate promoted content pairs based on qualification scores determined for the plurality of online article and candidate promoted content pairs;
  determine an arrangement, for the webpage, of two or more articles and one or more candidate promoted content comprising the target pair comprising the target article and the target promoted content, wherein the determining the arrangement includes:
    determining a first location, in a stream of slots on the webpage, for the target article with which the target promoted content is paired; and
    determining a second location, in the stream of slots on the webpage, for the target promoted content based on a determination that the second location is adjacent to the first location, on the webpage, of the target article with which the target promoted content is paired;
  display the target article, in the first location, on the webpage; and
  display the target promoted content, in the second location determined based on the target article, on the webpage.

2. The computer server system of claim 1, wherein the processor is further directed to:
  display the target promoted content in the second location responsive to a request for the webpage from a first user;
  receive a second request for the webpage from a second user;
  determine a second arrangement, for the webpage, of two or more articles and one or more candidate promoted content, wherein the determining the second arrangement includes determining the second location, on the webpage, for second target promoted content different than the target promoted content; and
  display the second target promoted content, in the second location, on the webpage for the second user such that the first user and the second user are provided with different arrangements of the webpage that comprise different promoted content in the same second location.

3. The computer server system of claim 1, wherein the processor is further directed to:
  receive a request to open the webpage from a user over a network;
  obtain information of the user;
  select the plurality of online articles based on the information of the user; and
  select the at least one candidate promoted content from a promoted content database based on the information of the user and content of at least one of the plurality of online articles.

4. The computer server system of claim 1, wherein the first location is associated with a first slot in a column of the stream of slots on the webpage, the second location is associated with a second slot in the column of the stream of slots on the webpage, and the second slot is adjacent to the first slot.

5. The computer server system of claim 1, wherein to obtain the plurality of online articles the processor is further directed to obtain the plurality of online articles to display on the webpage under a first order.

6. The computer server system of claim 5, wherein the processor is further directed to move a position of the target article in the first order to display the target article in a predetermined position.

7. The computer server system of claim 1, wherein the determining a virality score, determining a similarity score and determining a qualification score for each of the plurality of online article and candidate promoted content pairs comprises:
  determining a first virality score of a first online article, of a first online article and candidate promoted content pair, indicating popularity of the first online article among online users;
  determining a first similarity score indicating similarity between the first online article and a first candidate promoted content of the first online article and candidate promoted content pair;
  determining a first qualification score, of the qualification scores, for the first online article and candidate promoted content pair based on the first virality score of the first online article and the first similarity score of the first online article and the first candidate promoted content;
  determining a second virality score of a second online article, of a second online article and candidate promoted content pair, indicating popularity of the second online article among online users;
  determining a second similarity score indicating similarity between the second online article and a second candidate promoted content of the second online article and candidate promoted content pair; and
  determining a second qualification score, of the qualification scores, for the second online article and candidate promoted content pair based on the second virality score of the second online article and the second similarity score of the second online article and the second candidate promoted content.

8. A computer-implemented method for placing promoted content in content streams, comprising:
  obtaining a plurality of online articles for display on a webpage;
  obtaining at least one candidate promoted content for each of the plurality of online articles to form a plurality of online article and candidate promoted content pairs;
  for each of the plurality of online article and candidate promoted content pairs:

determining a virality score of an online article, of an online article and candidate promoted content pair, indicating popularity of the online article among online users;

determining a similarity score indicating similarity between the online article and a candidate promoted content of the online article and candidate promoted content pair; and determining a qualification score for the online article and candidate promoted content pair based on the virality score of the online article and the similarity score of the online article and the candidate promoted content;

selecting a target pair comprising a target article and a target promoted content from the plurality of online article and candidate promoted content pairs based on qualification scores determined for the plurality of online article and candidate promoted content pairs;

determining an arrangement, for the webpage, comprising the target pair comprising the target article and the target promoted content, wherein the determining the arrangement includes:

determining a first location, on the webpage, for the target article with which the target promoted content is paired; and determining a second location, on the webpage, for the target promoted content based on a determination that the second location is close to the first location, on the webpage, of the target article with which the target promoted content is paired;

displaying the target article, in the first location, on the webpage; and displaying the target promoted content, in the second location, on the webpage.

9. The method of claim 8, further comprising:

displaying the target promoted content based on the arrangement responsive to a request for the webpage from a first user;

receiving a second request for the webpage from a second user;

determining a second arrangement, different than the arrangement, for the webpage; and displaying the webpage, based on the second arrangement, for the second user.

10. The method of claim 8, further comprising:

receiving a request to open the webpage from a user over a network;

obtaining information of the user;

selecting the plurality of online articles based on the information of the user; and selecting the at least one candidate promoted content from a promoted content database based on the information of the user and content of at least one of the plurality of online articles.

11. The method of claim 8, wherein the determining the second location is based on a determination that, when the target article is displayed in the first location, displaying the target promoted content in the second location is associated with a threshold probability of interaction with the target promoted content.

12. The method of claim 8, wherein the obtaining the plurality of online articles comprises obtaining the plurality of online articles to display on the webpage under a first order.

13. The method of claim 12, further comprising moving a position of the target article in the first order to display the target article in a predetermined position.

14. The method of claim 13, wherein the predetermined position is a position that is associated with a higher level of attention of a user.

15. A non-transitory processor-readable storage medium comprising a set of instructions for placing promoted content in content streams, wherein when executed by a processor, the set of instructions directs the processor to perform acts of:

obtaining a plurality of online articles for display on a webpage;

obtaining at least one candidate promoted content for each of the plurality of online articles to form a plurality of online article and candidate promoted content pairs;

for each of the plurality of online article and candidate promoted content pairs:

determining a virality score of an online article, of an online article and candidate promoted content pair, indicating popularity of the online article among online users;

determining a similarity score indicating similarity between the online article and a candidate promoted content of the online article and candidate promoted content pair; and determining a qualification score for the online article and candidate promoted content pair based on the virality score of the online article and the similarity score of the online article and the candidate promoted content;

selecting a target pair comprising a target article and a target promoted content from the plurality of online article and candidate promoted content pairs based on qualification scores determined for the plurality of online article and candidate promoted content pairs;

determining an arrangement, for the webpage, of two or more articles and one or more candidate promoted content comprising the target pair comprising the target article and the target promoted content, wherein the determining the arrangement includes:

determining a first location, in a stream of slots on the webpage, for the target article with which the target promoted content is paired; and determining a second location, in the stream of slots on the webpage, for the target promoted content based on a determination that the second location is adjacent to the first location, on the webpage, of the target article with which the target promoted content is paired;

displaying the target article, in the first location, on the webpage; and displaying the target promoted content, in the second location, on the webpage.

16. The storage medium of claim 15, wherein the target promoted content is at least one of an online ad, article, news, or audio visual content; and the plurality of online articles is displayed in a content stream on the webpage.

17. The storage medium of claim 15, wherein the set of instructions further directs the processor to perform acts of:

receiving a request to open the webpage from a user over a network;

obtaining information of the user;

selecting the plurality of online articles based on the information of the user; and selecting the at least one candidate promoted content from a promoted content database based on the information of the user and content of at least one of the plurality of online articles.

18. The storage medium of claim 15, further comprising displaying a second promoted content on the webpage.

19. The storage medium of claim 15, wherein the obtaining of the plurality of online articles comprises obtaining the plurality of online articles to display on the webpage under a first order.

20. The storage medium of claim 19, wherein the set of instructions further directs the processor to perform acts of moving a position of the target article in the first order to display the target article in a predetermined position that is associated with a higher level of attention of a user.

* * * * *